Dec. 30, 1924.  1,521,014
E. R. DRAVER
REGULATING DEVICE FOR PERCENTAGE FEEDERS
Filed March 31, 1923   3 Sheets-Sheet 1
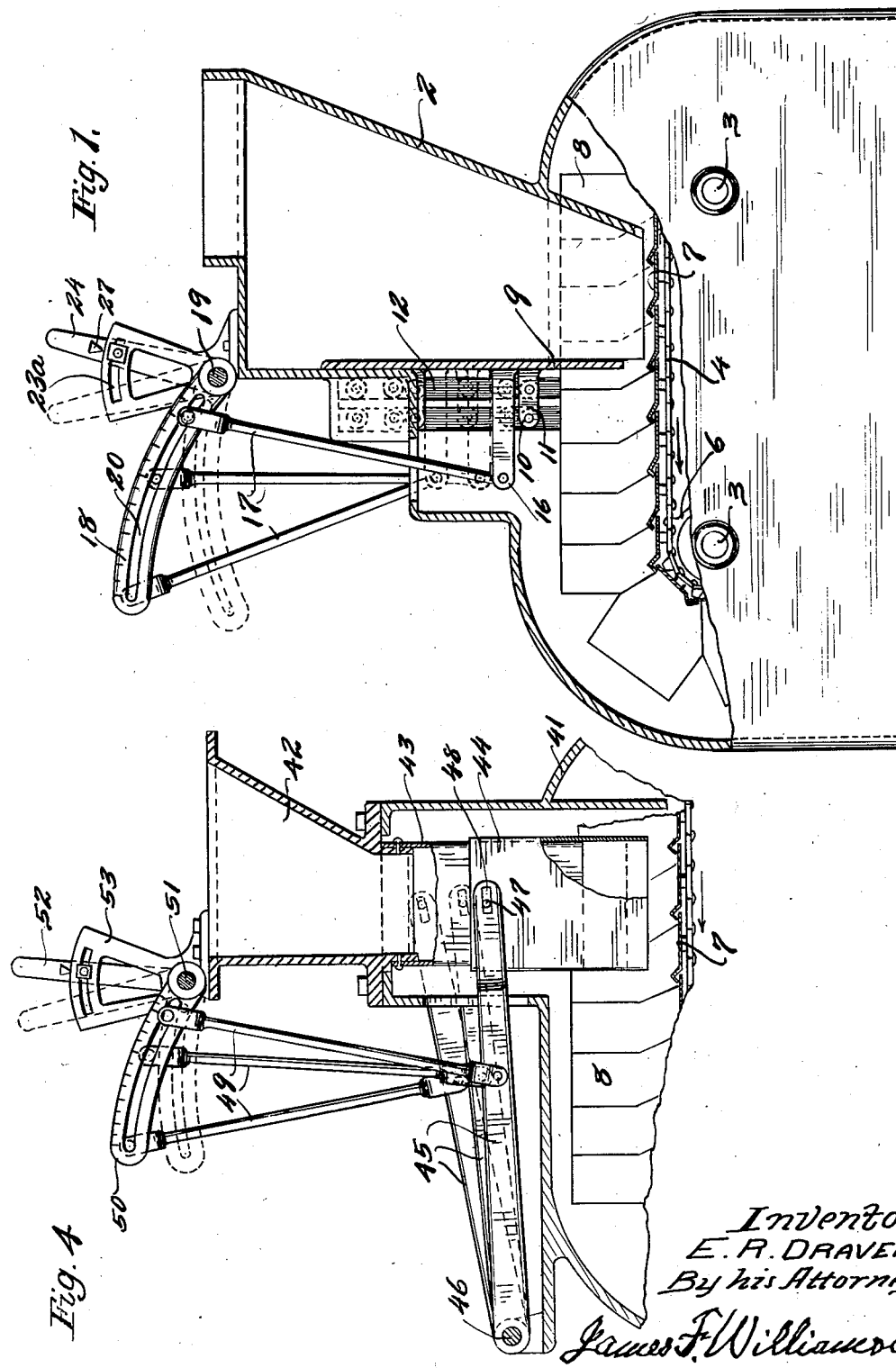
Inventor
E. R. DRAVER
By his Attorney
James F. Williamson Dec. 30, 1924.  1,521,014
E. R. DRAVER
REGULATING DEVICE FOR PERCENTAGE FEEDERS
Filed March 31, 1923  3 Sheets-Sheet 2
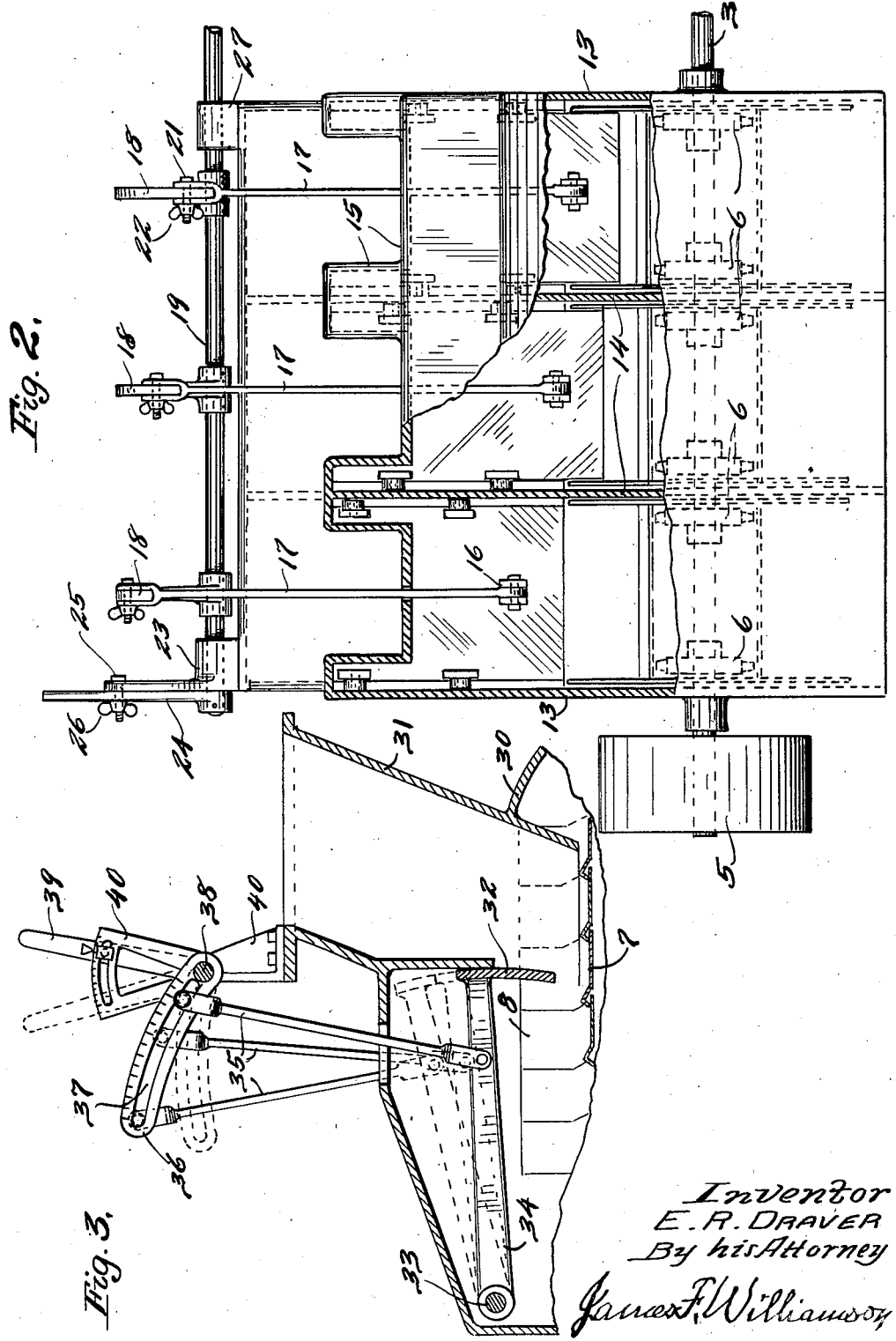
Inventor
E. R. DRAVER
By his Attorney
James F. Williamson Dec. 30, 1924.  1,521,014
E. R. DRAVER
REGULATING DEVICE FOR PERCENTAGE FEEDERS
Filed March 31, 1923  3 Sheets-Sheet 3

Inventor
E. R. DRAVER
By his Attorney
James F. Williamson

Patented Dec. 30, 1924.

1,521,014

UNITED STATES PATENT OFFICE.

EMIL R. DRAVER, OF RICHMOND, INDIANA, ASSIGNOR OF ONE-THIRD TO ORRIN DRAVER AND ONE-THIRD TO FLORENCE DRAVER, BOTH OF RICHMOND, INDIANA.

REGULATING DEVICE FOR PERCENTAGE FEEDERS.

Application filed March 31, 1923. Serial No. 629,223.

*To all whom it may concern:*

Be it known that I, EMIL R. DRAVER, a citizen of the United States, residing at Richmond, in the county of Wayne and State of Indiana, have invented certain new and useful Improvements in Regulating Devices for Percentage Feeders; and I do hereby declare the following to be a full, clear, and exact description of the invention, such as will enable others skilled in the art to which it appertains to make and use the same.

This invention relates to the art of feeding devices and particularly to feeding devices adapted to feed fine loose material such as grain comminuted material, ground cereals, etc. The invention is particularly designed for use with feeding machines adapted to proportionately feed materials. There are many composite products today in which the constituents bear certain definite proportions. One of such products is stock feed and such feed is now produced in large quantities and the proportions of the various constituents thereof are, in many States, regulated by statute. It is very important, therefore, to have machinery which will accurately and definitely feed the material proportionately. It is also desirable in factories equipped with such machinery to be able to vary the rate of feed of a battery of machines without varying the proportionate feed between the various feeders of the battery. With such an arrangement the output of the equipment can be speeded up or slowed down, according to orders and trade conditions.

It is an object of this invention, therefore, to provide a regulating means for each feeder of a battery of feeders whereby the feeders can be arranged to feed in definite proportion, together with means for simultaneously adjusting all of said means to increase or decrease the amount of material fed without changing the proportionate rate of feed between the feeders of the battery.

It is a further object of the invention to provide an adjustable discharge means for each feeder of a battery of feeders together with means for simultaneously moving all of said discharge means to vary the amount of material fed without changing the ratio of feed between the various feeders of the battery.

It is more specifically an object of the invention to provide a battery of feeders with a regulating gate for each feeder, preferably arranged adjacent a moving element of the feeder and a swinging arm for each feeder to which the regulating gate is connected by a link movable longitudinally of said arm together with means for simultaneously moving the arms of all of the feeders whereby the amount of material fed will be varied without varying the ratio of feed between the various feeders of the battery.

These and other objects and advantages of the invention will be fully set forth in the following description made in connection with the accompanying drawings in which like reference characters refer to the same parts throughout the different views, and in which, Fig. 1 is a view partly in side elevation and partly in vertical section showing one form of the invention applied to a feeding device;

Fig. 2 is a view in front elevation with parts broken away, and in section of the device shown in Fig. 1;

Fig. 3 is a view similar to Fig. 1 showing a slightly modified form of the invention;

Fig. 4 is a view similar to Fig. 1 showing another modification of the invention;

Figure 5:
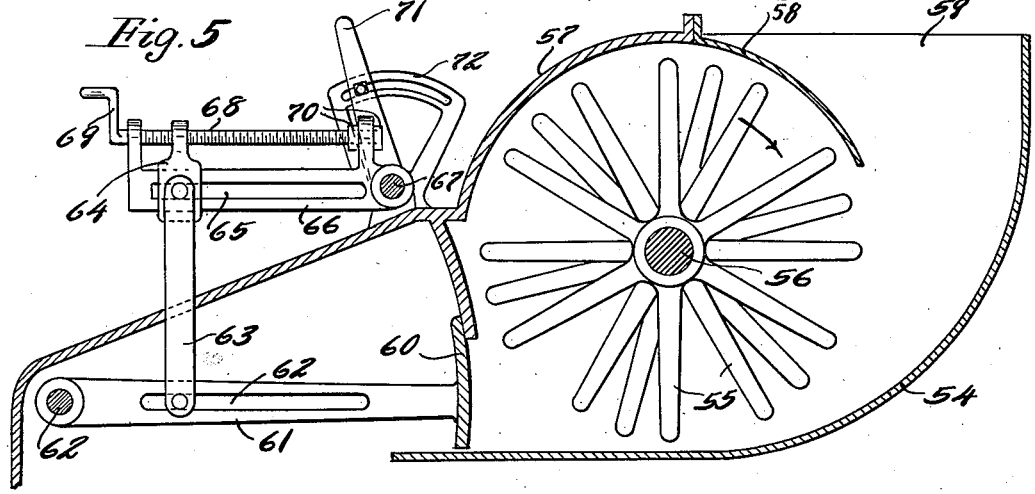
Fig. 5 is a view similar to Fig. 1 showing a modified form of the feed regulating device and also a different form of feeder.

Referring to the drawings, particularly to Figs. 1 and 2, a feeding device of the percentage feeder type is shown comprising a casing or housing 1 having extending upward therefrom a hopper 2 with an open upper end in which the material to be fed is deposited. A housing 1 comprises the end walls 13 and the intermediate walls 14, which latter divide the housing and hopper 2 into transverse compartments. Shafts 3 extend transversely through the casing 1 and one or both of these shafts is driven from a suitable pulley 5 to drive an endless chain 4 carried in sprockets 6 secured to the shafts 3. The elements or links of the chain 4 have secured thereto plate members 7 having extending upwardly from the sides thereof or secured thereto to the plates 8. The adjacent plates 7 and 8 are formed to overlap, as shown in Fig. 1, for which purpose each plate 7 has an upwardly bent angular lip at its forward edge. The plates 7 and 8 thus form a trough which moves under the hopper 2 and carries material therefrom to the forward part of the housing 1 where it is discharged to a suitable chute or other means. It will be noted and readily seen from Fig. 2 that there is a trough formed by the plates 7 and 8 in each of the compartments of the housing.

To regulate the amount of material which is continuously carried from each hopper 2 on the feeding members formed by the plates 7 and 8, a gate or discharge device 9 is provided which is vertically slidable substantially in line with the rear wall of the hopper 2 and movable in guides formed in the housing 1. While any form of guiding means could be used in the embodiment of the invention illustrated, the gate 9 is shown as having projecting arms 10 carrying antifriction rollers 11 which are movable in grooves or guideways 12 formed in the end walls 13 of the housing 1 and in walls 14.

It will be seen from Figs. 1 and 2 that housing 1 has raised or upwardly projecting portions 15 at the rear of the hopper 2 forming chambers to accommodate the movements of the arms 10 and rollers 11. The gates 9 in the individual compartments are adapted to be independently regulated and for this purpose each gate has a forwardly projecting arm 16 bifurcated at its forward end to receive and be pivotally connected to links 17 which extend vertically through openings formed in the upper portion of the casing 1. The links 17 are bifurcated at their upper ends and embrace, respectively, the arms 18 which are secured to a shaft 19 extending transversely across the top of the housing 1. The arms 18 are arcuate in form and provided with a longitudinally extending slot 20 and the links 17 are movable longitudinally of said arms and adapted to be held in various positions thereon by the clamping bolts 21 extending through said slot and the forks on said links and receiving clamping wing nuts 22. The arms 18, preferably, are graduated for convenient adjustment and positioning of the links 17. The housing 1 has a bracket 23 secured to the top thereof and at one end thereof forming one of the bearings for shaft 19. This bracket has a vertically extending portion forming a segment having an arcuate slot 23ᵃ adjacent its upper edge, which slot is concentric with the shaft 19. Said bearing has a flat outer surface and a handle arm 24 is secured to the end of shaft 19 adapted to move in close proximity to said bracket and to be clamped in various positions relative thereto by a headed bolt 25 extending through slot 23ᵃ in said arm and provided with a clamping wing nut 26. The arm 24 is provided with a pointer 27 and the bracket 23 may be graduated for facilitating the positioning of said arm. The shaft 19 is also journaled in a bearing 27 secured to the top of the housing at the other end thereof and said shaft is adapted to be extended to other feeders of a battery of feeders which are arranged in alinement with the housing 1.

When the material is placed in the hoppers 2 the same will, as stated, be carried forwardly and discharged into the desired place by the traveling troughs, and gates 9 in the various compartments of the feeder can be independently adjusted by moving the ends of the links 17 longitudinally of the arms 18 so that a certain definite ratio or proportion of feed between the various troughs or feeders can be arranged. In practice, the various compartments will contain different materials forming constituents of the composite material, such as stock feed. After the gates 9 have been so adjusted to give the desired ratio or proportion of feed, if it is desired to increase the amount of material fed or decrease the same, this can be done by swinging the arm 24 to simultaneously swing all of the arms 18 and thus adjust the gates 9. It will readily be seen that by the structure described, this increase or decrease of the rate of feed will be made without varying the ratio or proportion of the rate of feed between the various troughs or feeders. The openings of the gates 9 are proportioned to the ratio of the legs of right triangles having the same base angle and this ratio will, of course, be constant, no matter what the angle is. With the use of the structure described, the rate of feed of a large battery of feeders may therefore be quickly and simultaneously changed without disturbing the ratio of feed at which the feeders have been set.

In Fig. 3 a slightly modified form of discharge regulating gate is shown. The device shown in this figure comprises the housing 30 having hoppers 31 and compartments therein through which travel the feeding troughs formed of the plates 7 and 8 already described. The regulating gates for determining the amount of material carried from the hoppers 31 by the troughs are shown as 32 and are slightly arcuate in form being concentric with a shaft 33 extending transversely through the hopper and having the arms 34 pivoted thereto by which the gates 32 are carried. The arms 34 are embraced by the forked ends of the links 35 to which they are pivotally connected and said links are forked at their upper ends to embrace arcuate arms 36 having longitudinal slots 37 and being secured to a shaft 38 extending transversely of the housing 30.

The links 35 are adapted to be moved longitudinally of the arms 36 and clamped thereto by means described in connection with Figs. 1 and 2 and the shaft 37 is adapted to be swung by a handle arm 39 moving adjacent a segmental bracket 40 secured to the housing 30. The arms 39 and brackets 40 and associated parts are similar in structure to the arms 24 and bracket 23 already described.

It will be seen that the gates 32 may be individually and independently adjusted by movement of the links 35 longitudinally of arms 36 and it will also be apparent that the gates may all be simultaneously moved by movement of arms 39 and shaft 38 without changing the ratio or proportion of rate of feed of the different gates.

In Fig. 4, housing 41 is shown which is divided into compartments the same as the hopper 1 already described and has troughs composed of plates 7 and 8 moving therethrough. The hopper 42 provided on the housing 41 has a depending cylindrical portion 43 which is surrounded by a vertically moving cylinder 44. Each of the cylinders 44 is embraced by the forked end of a lever 45, all of which are pivoted to a shaft 46 extending transversely of the housing 41. The sleeves or cylinders 44 have outwardly extending pins 47 adapted to move in slots 48 formed in the ends of the levers 45. The levers 45 are pivotally connected by links 49 to swinging arms 50 secured to a shaft 51 supported on and extending across the top of the casing 41. The shaft 51 is swung by a handle arm 52 moving adjacent a segmental bracket 53 secured to the housing and forming one of the bearings for the shaft 51. The handle arms 52, bracket 53 and arms 50 are similar in structure to the members 24, 23 and 18 described in connection with Figs. 1 and 2.

It will readily be seen that the links 49 can be moved longitudinally of the arms 50 to independently adjust the sleeves 44 to vary the amount of material which is carried or fed by the troughs formed of plates 7 and 8. All of the arms 50 can simultaneously be swung by movement of arms 52 to vary the amount of material fed without changing the ratio of feed for which the individual sleeves 44 have been set.

In Fig. 5 a different form of feeder is shown comprising a housing 54 having a curved front wall which extends some distance from a rotating feeding device comprising a plurality of wheels 55 secured to a shaft 56 extending transversely of the hopper, which wheels are formed with radially extending arms, as shown. The arms of the various wheels are preferably arranged in staggered relation. The top 57 of the hopper extends down around the wheels 55 and a guard flange 58 is also provided extending forwardly over the wheel to prevent the material from being thrown out of the hopper by the rotation of the wheel. The material is deposited in the portion 59 of the casing and is fed over the rear edge of the bottom of the casing, the discharge thereof being regulated and determined by the arcuate gate 60 carried by an arm 61 pivoted to the shaft 62 extending transversely of the housing 54. It will, of course, be understood that there are various compartments of the housing, each having a feeding device therein, as shown and described in Figs. 1 and 2. The arm 61 has a longitudinal slot 62 therein in which the lower end of link 63 is pivoted and movable and said link is pivotally connected at their upper ends to a block 64 guided in a slot 65 extending longitudinally of an arm 66 adapted to swing about a shaft 67 extending across the top of the housing 54. The block 64 has an upwardly projecting portion forming a nut and engaged by the screw 68 having a crank handle 69 at its forward end which is journaled in an extension of arm 66, the said screw being also journaled in an upwardly extending member at the rear end of the arm 66 and held from longitudinal movement by spaced collars 70 engaging the same. The shafts 67 and arms 66 are oscillated by a handle arm 71 held in engagement with and movable adjacent a segmental bracket 72 carried by the housing 54. The arms 71 and bracket 72 are substantially the same in structure as the arms 23 and arms 24 already described.

With this structure shown in Fig. 5, it will be seen that the block 64 can be progressed along the arm 66 to vary the position of the gate 60. The lower end of the link 63 can also be moved in the slot 62 and clamped in various positions for the purpose of adjusting the gate 60. The gates 60 in the various compartments or feeders can thus be independently adjusted and a proportionate feeding of the material effected. The gates can then all be simultaneously raised or lowered by swinging of the arm 71 without changing the proportion of feed from the various feeders. The adjustment of the block 64 and gate 60 can be easily and quickly made by turning of screw 68 by the handle 69 and such adjustment very accurately determined.

Figure 6:
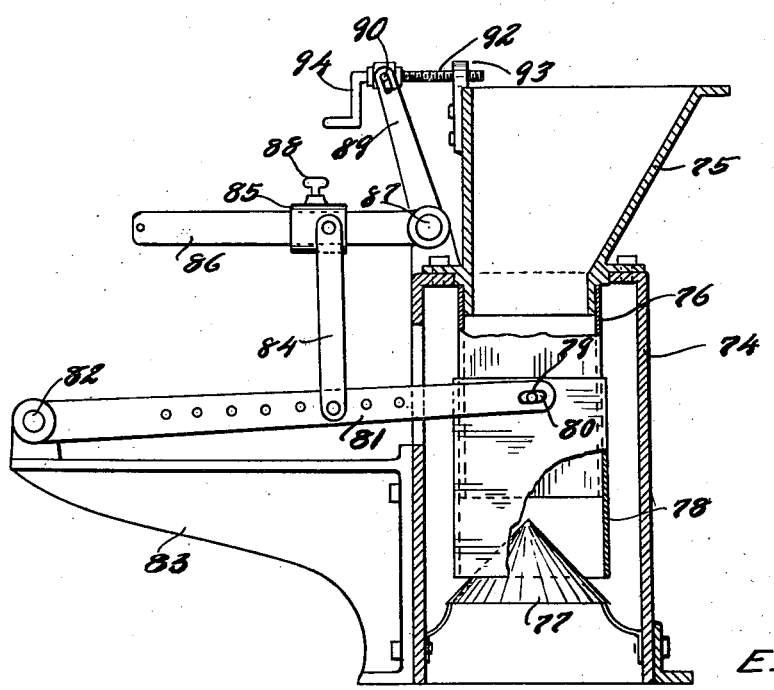
Fig. 6 is a view similar to Fig. 1 showing a still further modified form of the feed regulating device applied to a different form of feeder.

In Fig. 6, a feeding device comprising stationary elements is disclosed equipped with adjustable discharge devices embodying applicant's invention. This feeder comprises a housing or casing 74 having hoppers 75 formed thereon, each of which has an independent sleeve 76 extending into the compartment of the housing 74. A conical member 77 is secured in each of the compartments some distance below the end of the sleeve 76 and centrally alined therewith. A sleeve 78 is arranged to slide on the sleeve 76 and be adjusted various distances above the cone 77. The sleeve 78 has outwardly projecting pins 79 disposed in slots 80 formed in the sides of a fork on the end of a lever arm 81, which arm is pivoted on a shaft 82 extending transversely of the casing 74 and supported on a bracket 83 secured thereto. The arm 81 has a plurality of holes therein with any one of which the lower end of a link 84 is adapted to be pivotally connected, said link being pivotally connected at its upper end to a block 85 slidable on an arm 86 pivoted to a shaft 87 extending transversely of the casing 74. The block 85 is adapted to be secured in various positions on the arms 86 by a set screw 88. The shaft 87 has an arm 89 secured thereto having slots at its upper forked end adapted to receive oppositely extending pins 90 projecting from a nut 91 movably secured to a screw 92. The latter extends through a nut bracket 93 secured to and extending above one side of the hopper 75 and is provided at its other end with a crank handle 94.

In operation, the materials to be fed will be deposited in the hopper 75 and will pass down through the sleeve 76. The rate of flow or feed of the materials will be determined by the position of the sleeve 78 and this sleeve can be vertically adjusted by moving block 85 on arm 86 or by connecting the lower end of link 84 in the various holes in said arm. There will be a plurality of arms 86 and these arms on the various feeders can be simultaneously adjusted by turning the screw 92 by the handle 94 and swinging the arm 89. The different feeders can thus be set proportionately to feed the materials and can all simultaneously be adjusted to increase or decrease the rate of feed without disturbing said proportionate feed.

From the above description it is seen that applicant has provided a simple and efficient mechanism for regulating the feed from a plurality or battery of feeders whether constituting separate machine or parts of a percentage feeder. As has been fully described, the feed of the battery can be adjusted to increase or decrease the amount of material fed without disturbing the proportionate feed of the various feeders of the battery. The invention, as illustrated, can be applied to feeding devices of various forms and it will be readily seen that the regulating gates, such as shown in Figs. 1 to 5, could be used in a plurality of vertically extending or inclined chutes through which material is adapted to pass, irrespective of the kind of feeding device delivering to the chutes. The regulating mechanism and controlling devices, therefore, are quite simple and can readily be applied to most any battery of feeding devices.

It will, of course, be understood, that various changes may be made in the form, arrangement, details and proportions of the parts without departing from the scope of applicant's invention, which, generally stated, consists in a device capable of carrying out the objects enumerated and such as shown and described and set forth in the appended claims.

What is claimed is:

1. The combination with a plurality of feeding devices each having a discharge opening of constant size and an adjustable member to vary the effective area of said opening, whereby said feeders may be arranged to feed in a definite proportion, and means for simultaneously adjusting all of said members to increase or decrease the feed of all of said devices without varying said proportion.

2. The combination with a plurality of feeding devices, each comprising a moving feeding element, of a discharge regulating means adjacent each of said elements, means for adjusting said means to have said devices feed in a definite proportion, and means for simultaneously operating all of said last mentioned means to increase or decrease the feed of all of said devices without changing said proportion.

3. The combination with a plurality of feeding devices, of a substantially vertically movable discharge regulating member for each device, a swinging means on each device to which said member is adjustably connected for varying the rate of feed whereby said feeders can be arranged to feed in determined ratio, and means for swinging all of said means simultaneously to change the rate of feed without changing said ratio.

4. The structure set forth in claim 3, all of said swinging means being arranged about a common axis.

5. The combination with a plurality of feeding devices, of a regulating gate for each device, a pivoted arm on each device, links connecting said gates and arms, respectively, said links being movable longitudinally of said arms whereby the gates can independently be adjusted to cause said feeders to feed in determined ratio, and means for simultaneously swinging all of said arms to increase or decrease the feed of said devices without changing said ratio.

6. The structure set forth in claim 5, all of said arms being secured to a common shaft extending to all of said feeders.

7. The combination with a plurality of receptacles, each having an outlet opening, of a device of constant size regulating the size of said opening, means for moving said devices so that a proportionate feed may be had from said receptacles, and a single means for simultaneously moving all of said devices to vary the rate of feed from said receptacles while maintaining said proportionate feed.

8. The combination with a plurality of feeding devices, of a discharge regulating means for each feeding device, means for adjusting said regulating means so that said feeding devices will feed in a definite proportion, and means operable from a single point for simultaneously moving said regulating means different distances so that the rate of the feed may be varied and said proportion maintained.

9. The combination with a plurality of feeding devices, each having a discharge opening, of a member of constant size for each feeder adjustable relatively to said opening to vary the size of said discharge opening, whereby said devices can be arranged to feed in a different proportion, and means for simultaneously so adjusting all of said members to increase or decrease the feed without changing said proportion.

10. The combination with a plurality of feeding devices each comprising an element feeding material through a discharge opening, of a means of constant size on each device adjustable to regulate the discharge through said opening whereby said devices can be adjusted to feed in a definite proportion, and means for simultaneously moving all of said first mentioned means to increase or decrease the feed while maintaining said proportion, and while said feeding devices are operating.

11. A plurality of feeding means each having a discharge outlet with regulating means of constant size for varying the size of said outlet whereby said feeding means can be arranged to feed in a definite proportion, and a single means for simultaneously moving all of said regulating means different distances to increase or decrease the quantity of feed without varying the said proportion.

12. The combination with a plurality of feeding devices, each comprising a hopper, a movable discharge means, and having a feed opening of constant size, of a controlling gate of constant size for each device for varying the size of said opening whereby said devices may be arranged to feed in a definite proportion, of means operable from a single point for simultaneously moving all of said gates to increase or decrease the feed of all of said devices without varying said proportion.

13. The combination with a plurality of feeding means, each having a discharge opening of constant size and a single movable member to vary the effective area of said opening, whereby said feeders may be arranged to feed in a definite proportion, and means directly connected to said member for increasing or decreasing the feed of all of said devices without varying said proportion.

14. The combination with a plurality of feeding devices, each comprising a moving feeding element, of a discharge regulating means adjacent each of said elements, means for adjusting said means to have said device feed in a definite proportion, and means directly connected with said adjusting means for increasing or decreasing the feed of all of said devices without changing said proportion.

15. The combination with a plurality of feeding devices, each comprising a moving element, of a discharge regulating member adjacent each of said elements, means for adjusting said members to have said device feed in a definite proportion, and means for simultaneously adjusting all of said members to increase or decrease the feed of all of said devices without changing said proportion.

16. A feeding control device comprising a plurality of hoppers adapted to contain comminuted or granular material to be fed, each of said hoppers having a discharge opening of constant size, a member movable along and parallel to the side of said openings and forming, in effect, a continuation thereof, said members being movable to vary the effective area of said opening, said members being independently movable along said side whereby the hoppers can be arranged to feed in definite proportion, and means connected to all of said members for moving them in unison to vary the effective area of said discharge opening without varying said proportion.

17. A feed control device comprising a plurality of hoppers adapted to contain comminuted or granular material, each of said hoppers having a discharge opening of constant size, a member in each hopper movable to vary the effective size of said opening whereby said hoppers may be arranged to feed in a definite proportion, a member connected to each of said members for moving the same, and movable means to which all of said last mentioned members are connected for moving the same to increase or decrease the size of said opening without varying said proportion.

In testimony whereof I affix my signature.

EMIL R. DRAVER.